(12) United States Patent
Auguste

(10) Patent No.: US 10,542,810 B1
(45) Date of Patent: Jan. 28, 2020

(54) AUTOMATIC MANICURE APPARATUS

(71) Applicant: Hugh Auguste, Lubbock, TX (US)

(72) Inventor: Hugh Auguste, Lubbock, TX (US)

( * ) Notice: Subject to any disclaimer, the term of this patent is extended or adjusted under 35 U.S.C. 154(b) by 0 days.

(21) Appl. No.: 16/436,292

(22) Filed: Jun. 10, 2019

(51) Int. Cl.
*G06K 15/22* (2006.01)
*A45D 29/00* (2006.01)
*G06T 7/70* (2017.01)

(52) U.S. Cl.
CPC ............... *A45D 29/00* (2013.01); *G06T 7/70* (2017.01); *A45D 2029/005* (2013.01); *G06T 2207/30196* (2013.01)

(58) Field of Classification Search
None
See application file for complete search history.

(56) References Cited

U.S. PATENT DOCUMENTS

| | | |
|---|---|---|
| 5,931,166 A | 8/1999 | Weber |
| 6,035,860 A | 3/2000 | Mombourquette |
| 6,286,517 B1 | 9/2001 | Weber |
| 6,525,724 B1 * | 2/2003 | Takami ............... A45D 29/00 345/418 |
| D497,454 S | 10/2004 | Lin |
| 8,061,365 B2 * | 11/2011 | Rehkemper ............ A45D 29/00 132/73.6 |
| 8,695,495 B2 | 4/2014 | Hashimoto |
| 9,687,059 B2 | 6/2017 | Walla |
| 2005/0174367 A1 | 8/2005 | Kondo |
| 2011/0137452 A1 * | 6/2011 | Boyes ................... B23B 3/165 700/213 |
| 2015/0201734 A1 * | 7/2015 | Yamasaki ............. A45D 34/04 132/200 |
| 2015/0335131 A1 | 11/2015 | Ortiz |
| 2015/0374092 A1 * | 12/2015 | Bitoh ..................... A45D 29/00 132/200 |
| 2016/0185154 A1 * | 6/2016 | Bitoh ..................... B43L 13/00 347/110 |

* cited by examiner

Primary Examiner — Ted W Barnes

(57) ABSTRACT

An automatic manicure apparatus for quickly and efficiently manicuring fingernails includes a housing having a positioning unit comprising tracks and motors. A rotating tool unit coupled to the positioning unit has a rotator motor and a rotatable tool housing. A plurality of manicure tools is coupled to the rotatable tool housing and is in operational communication with the rotator motor. A camera is coupled to the rotator motor. A control panel is coupled to the housing and has a plurality of control buttons. A logic module is coupled to the control panel and is in operational communication with the motors, the camera, and the plurality of control buttons. A power source is coupled to the logic module. The power source is in operational communication with the logic module.

11 Claims, 7 Drawing Sheets

AUTOMATIC MANICURE APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to manicure tools and more particularly pertains to a new manicure tool for quickly and efficiently manicuring fingernails.

BRIEF SUMMARY OF THE INVENTION

An embodiment of the disclosure meets the needs presented above by generally comprising a housing that has a front side separated from a back side, a top side separated from a bottom side, and a left side separated from a right side defining an inner cavity. The front side has a pair of hand apertures extending through to the inner cavity. The top side has a pair of window apertures extending through to the inner cavity and aligning with the pair of hand apertures. Each of the pair of window apertures has a transparent window coupled therein. A positioning unit is coupled to the housing. The positioning unit comprises a pair of Y tracks coupled to the housing. The pair of Y tracks comprises a left Y track and a right Y track coupled to the back side adjacent the left side and the right side, respectively, and extends perpendicularly towards the front side. A pair of Y motors is coupled to the pair of Y tracks. The pair of Y motors comprises a left Y motor and a right Y motor coupled to the left Y track and the right Y track, respectively. The Y motors slidably travel along the Y tracks. An X track is coupled to the pair of Y motors, and the X track perpendicularly extends from the left Y motor to the right Y motor. An X-Z motor is coupled to the X track. The X-Z motor slidably travels along the X track. A Z track is coupled to the X-Z motor. The Z track lies perpendicular to the X track and each of the pair of Y tracks. The Z track slidably travels through the X-Z motor. A rotating tool unit is coupled to the positioning unit. The rotating tool unit comprises a rotator motor coupled to the Z track. The rotator motor has a rotatable tool housing. A plurality of manicure tools is coupled to the rotator motor. Each of the plurality of manicure tools is coupled to the rotatable tool housing and is in operational communication with the rotator motor. A camera is coupled to the rotator motor. The camera is freely coupled such that it remains oriented towards the bottom side of the housing at all times. A control panel is coupled to the housing. The control panel is coupled to the front side between the pair of hand apertures. The control panel has a plurality of control buttons. A logic module is coupled to the control panel. The logic module is in operational communication with the pair of Y motors, the X-Z motor, the rotator motor, the camera, and the plurality of control buttons. A power source is coupled to the logic module. The power source is in operational communication with the logic module.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
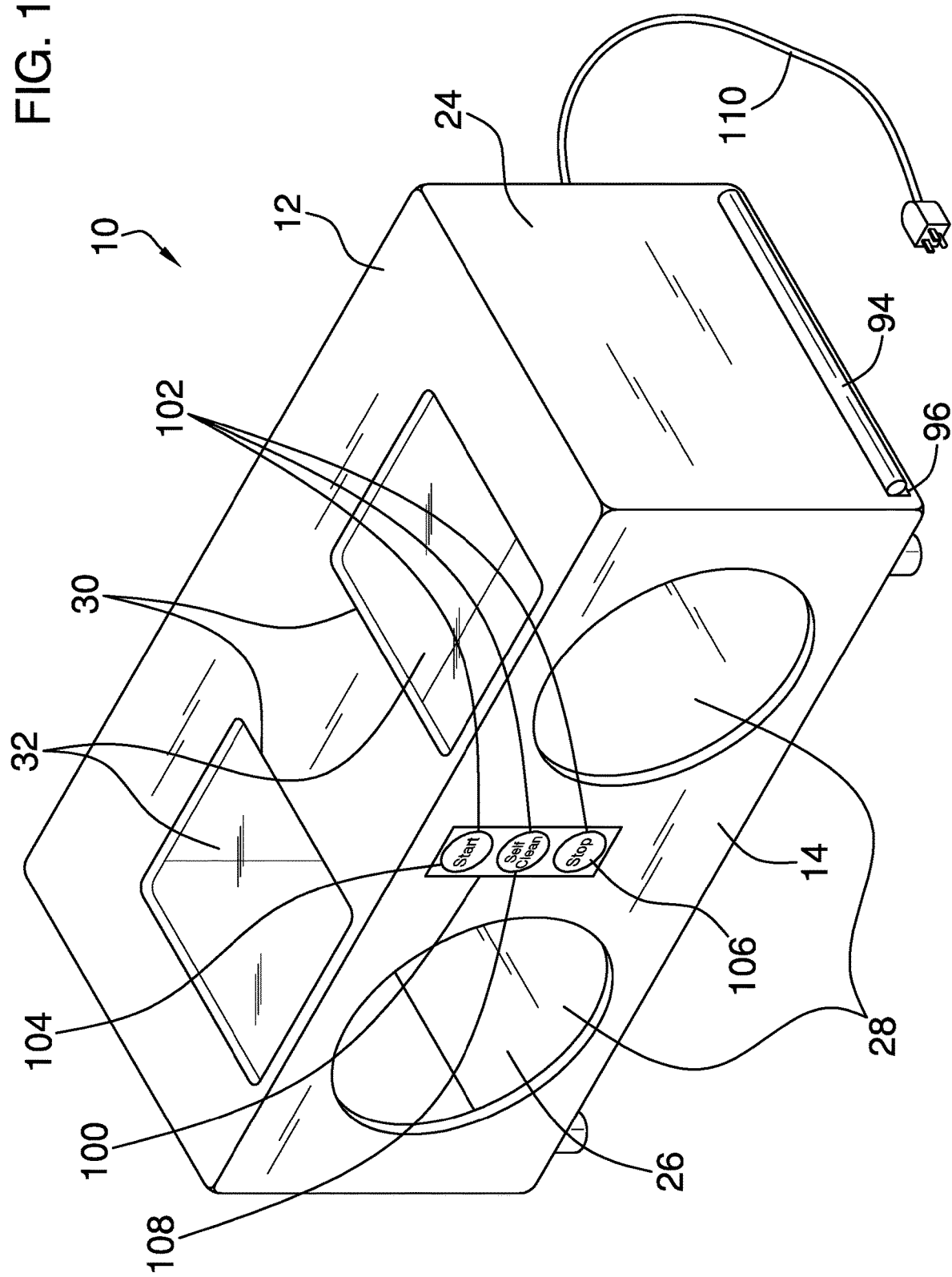
FIG. 1 is an isometric view of an automatic manicure apparatus according to an embodiment of the disclosure.
Figure 2:
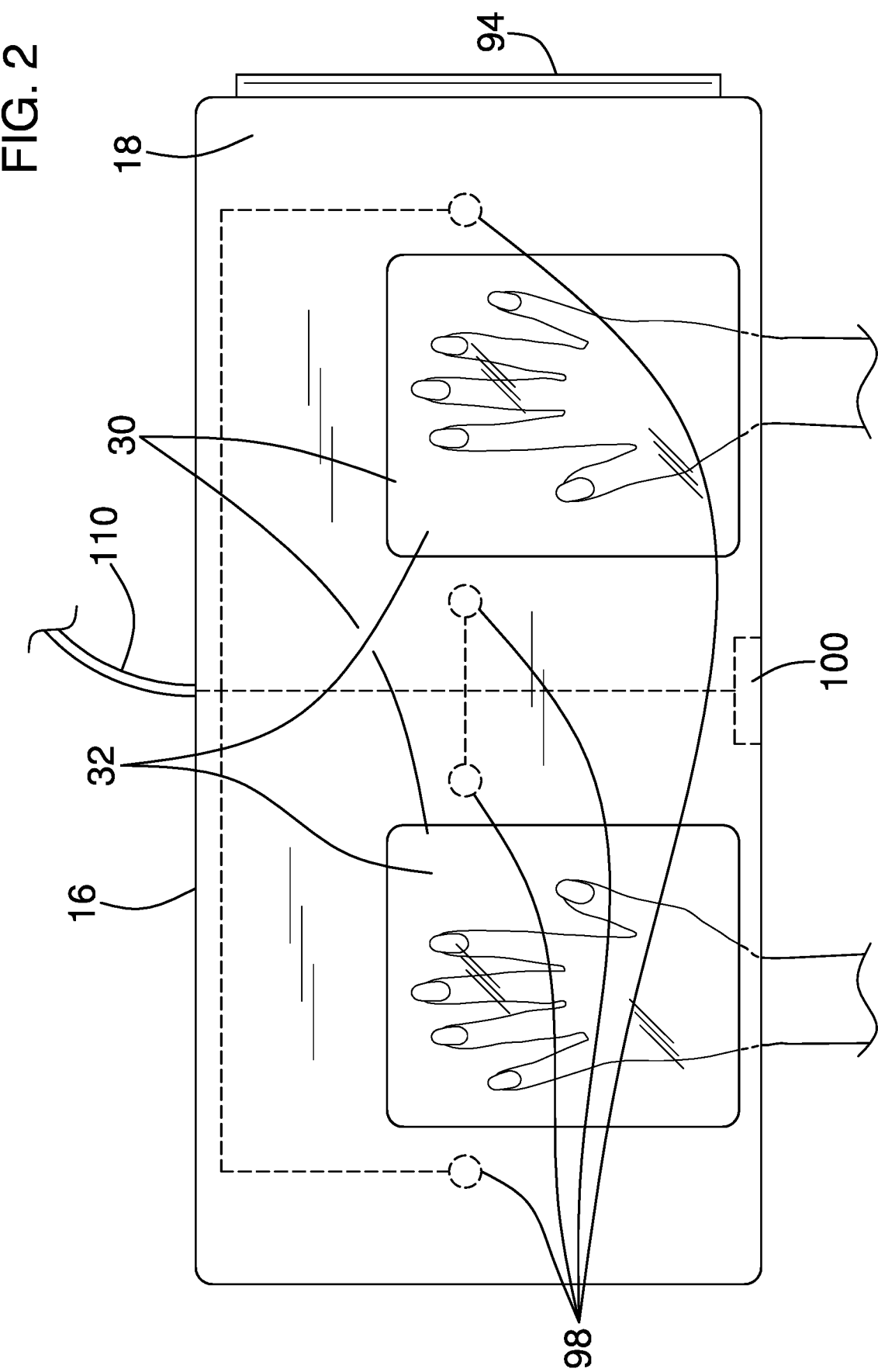
FIG. 2 is a top plan view of an embodiment of the disclosure.
Figure 3:
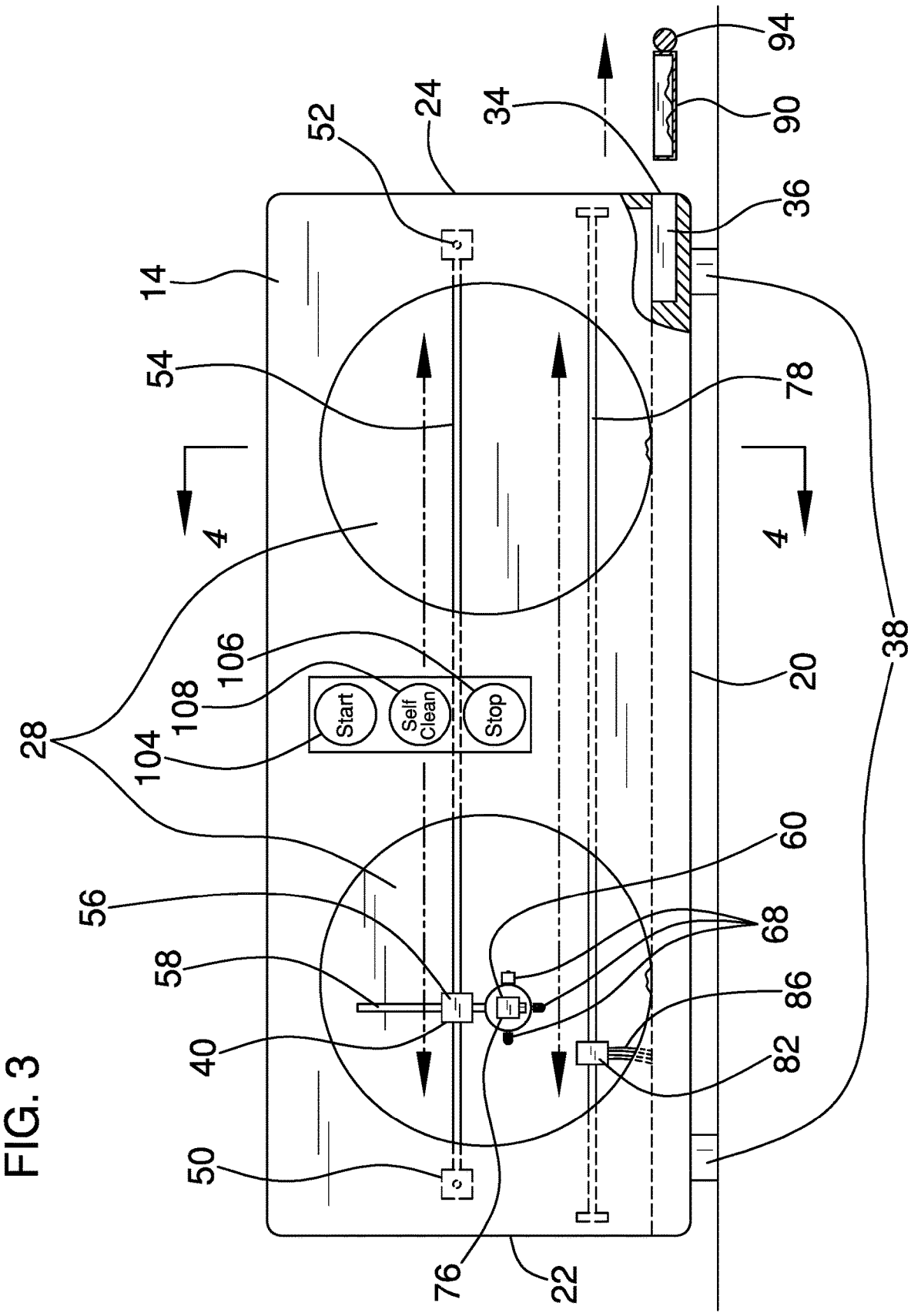
FIG. 3 is a front elevation view of an embodiment of the disclosure.
Figure 4:
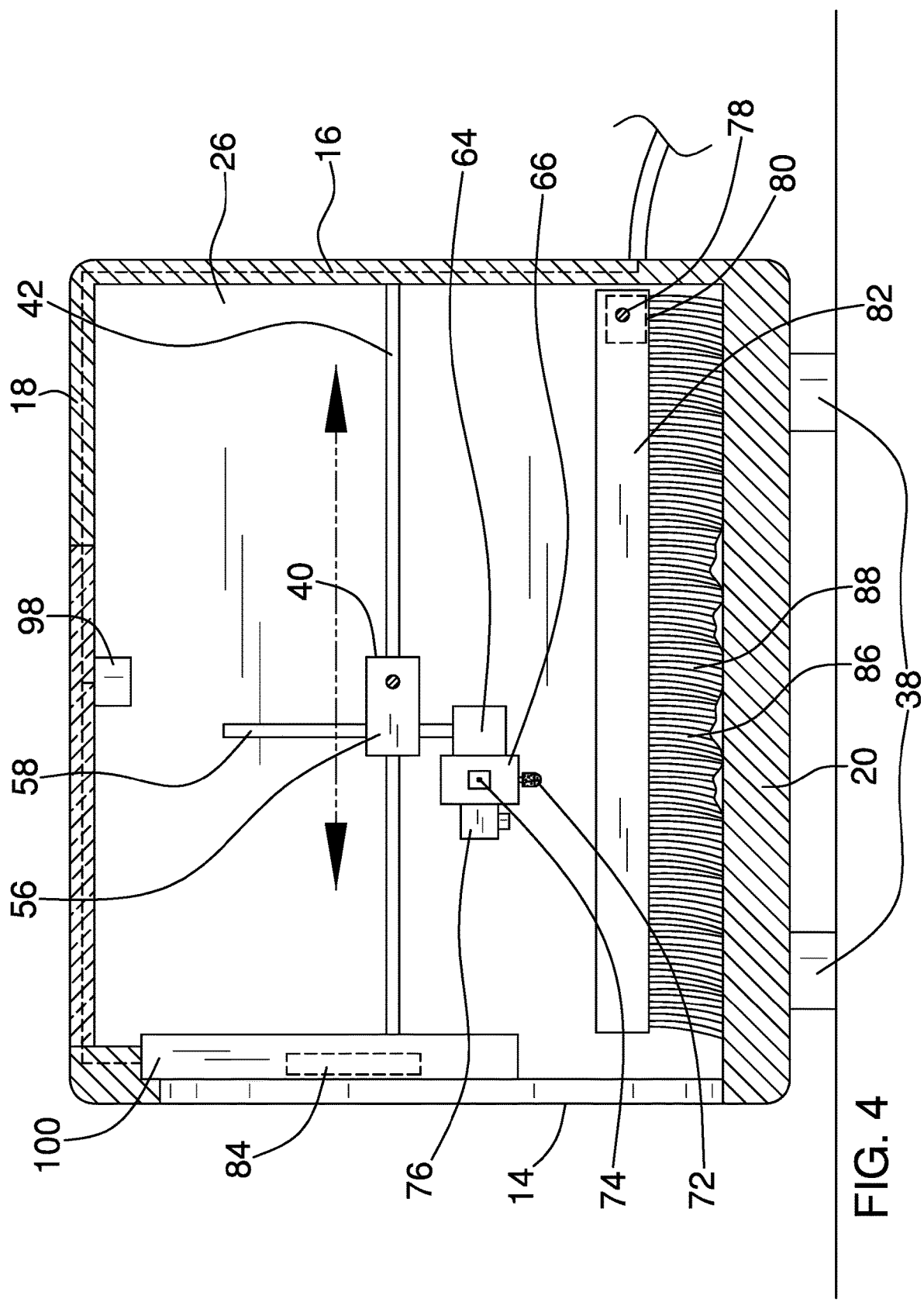
FIG. 4 is a cross section view of an embodiment of the disclosure.
Figure 5:
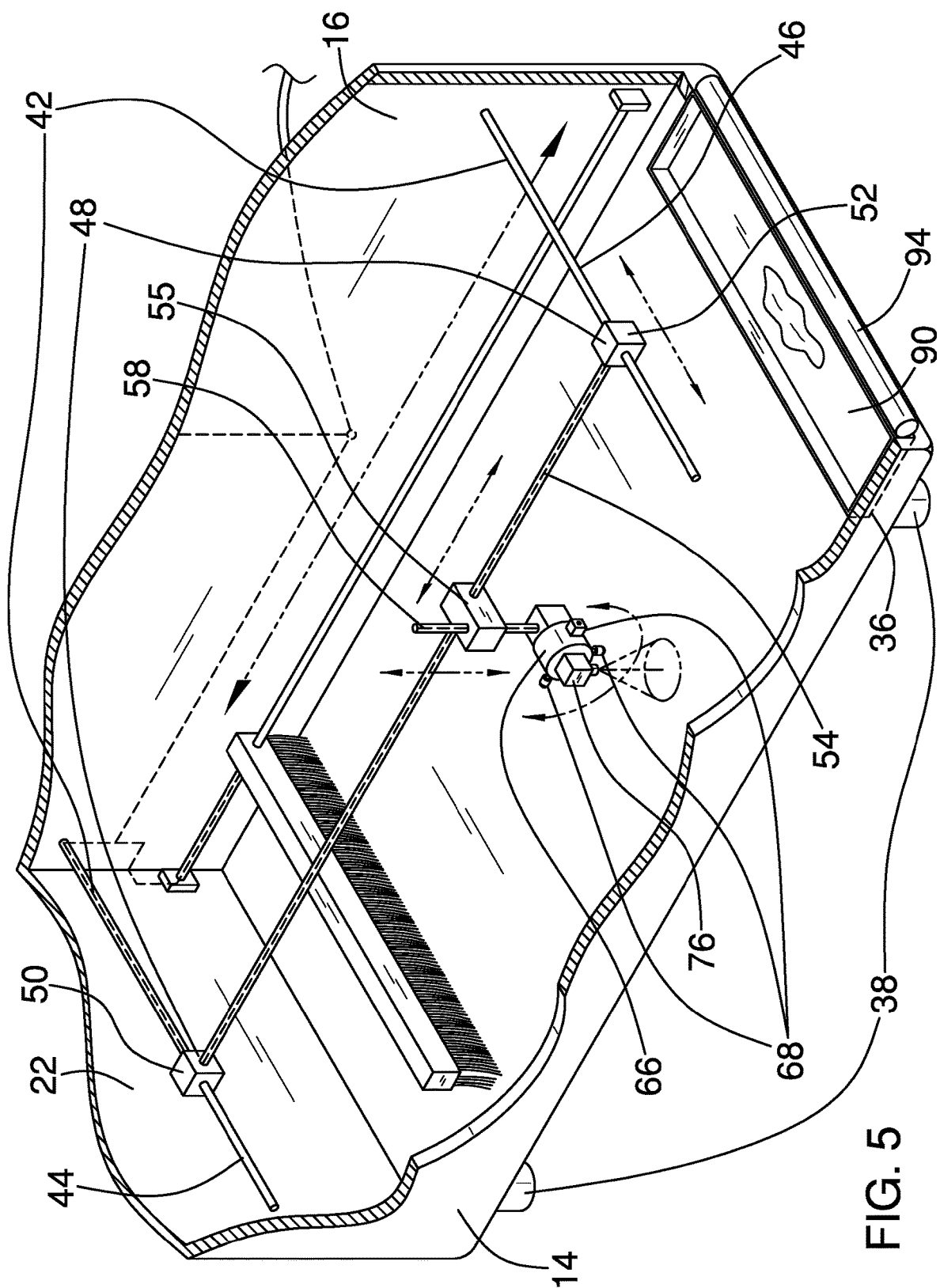
FIG. 5 is a cut out isometric view of an embodiment of the disclosure.
Figure 6:
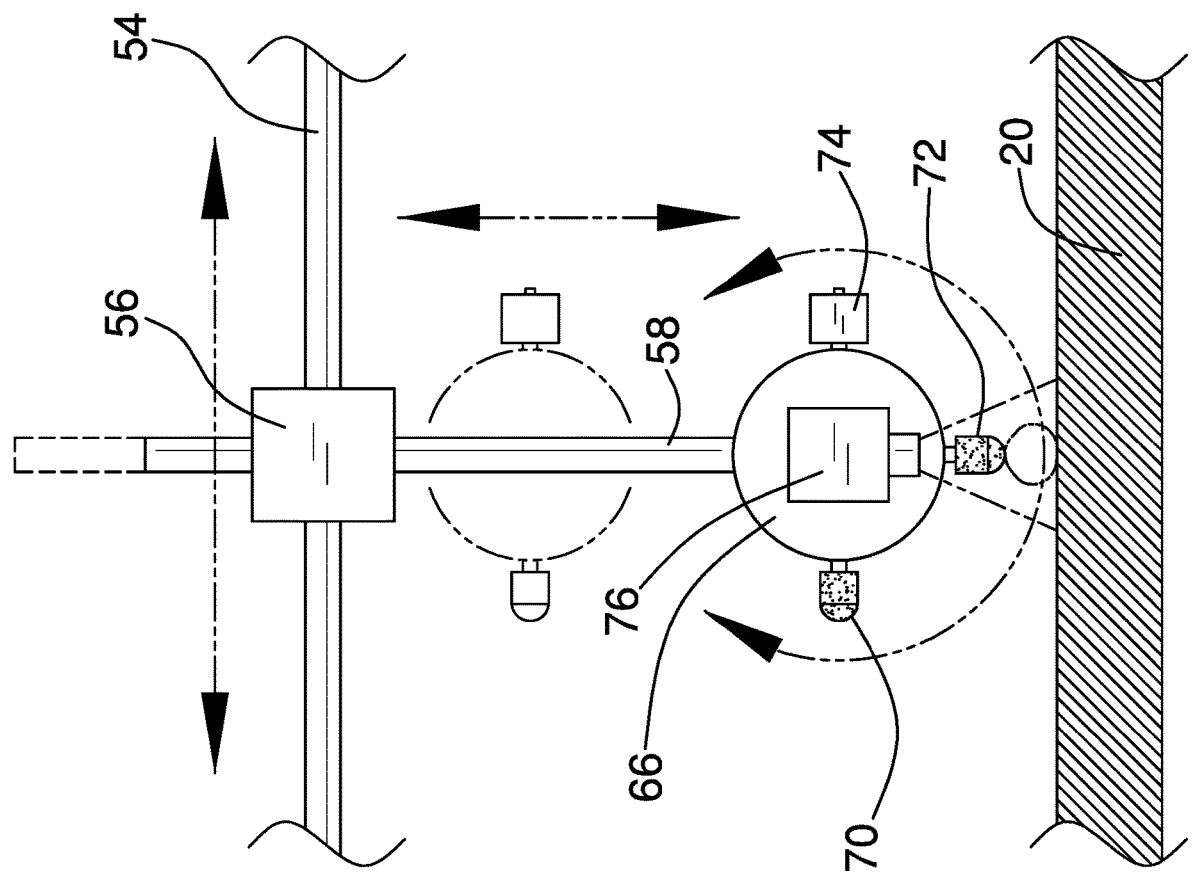
FIG. 6 is a detail view of an embodiment of the disclosure.
Figure 7:
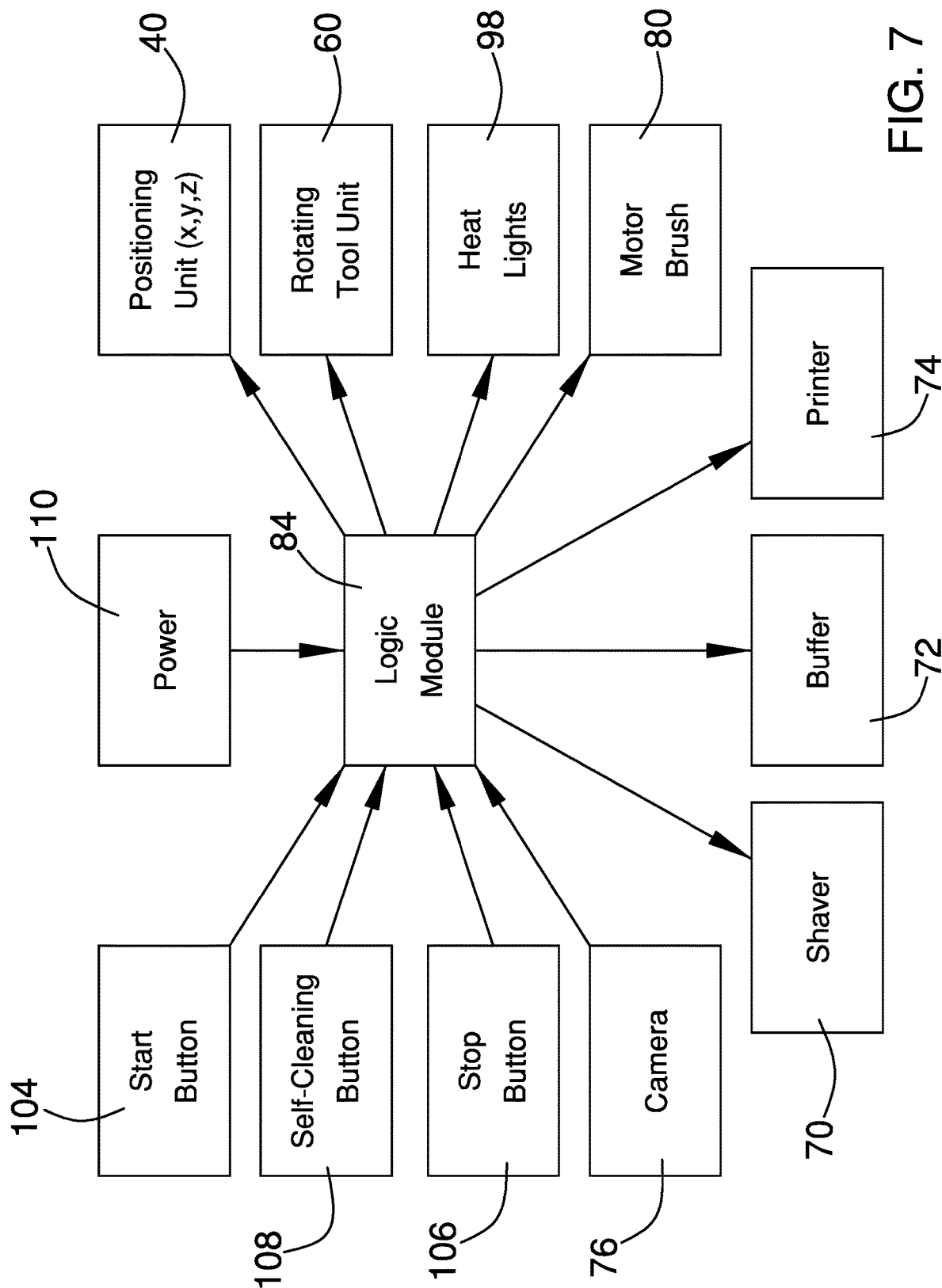
FIG. 7 is a block diagram of an embodiment of the disclosure.

With reference now to the drawings, and in particular to FIGS. 1 through 7 thereof, a new manicure tool embodying the principles and concepts of an embodiment of the disclosure and generally designated by the reference numeral 10 will be described.

As best illustrated in FIGS. 1 through 7, the automatic manicure apparatus 10 generally comprises a housing 12 that has a front side 14 separated from a back side 16, a top side 18 separated from a bottom side 20, and a left side 22 separated from a right side 24 defining an inner cavity 26.

The front side 14 has a pair of hand apertures 28 extending through to the inner cavity 26. The top side 18 has a pair of window apertures 30 extending through to the inner cavity 26 and aligning with the pair of hand apertures 28. Each of the pair of window apertures 30 has a transparent window 32 coupled therein. The right side 24 has a tray aperture 34 extending through to the inner cavity 26 and the bottom side 20 has a tray channel 36 adjacent the tray aperture 34.

A plurality of feet 38 is coupled to the housing. The plurality of feet 38 is coupled to the bottom side 20 of the housing 12. A positioning unit 40 is coupled to the housing 12. The positioning unit 40 comprises a pair of Y tracks 42 coupled to the housing 12. The pair of Y tracks 42 comprises a left Y track 44 and a right Y track 46 coupled to the back side 16 adjacent the left side 22 and the right side 24, respectively, and extend perpendicularly towards the front side 14. A pair of Y motors 48 is coupled to the pair of Y tracks 42. The pair of Y motors 48 comprises a left Y motor 50 and a right Y motor 52 coupled to the left Y track 44 and the right Y track 46, respectively. The Y motors 48 slidably travel along the Y tracks 42. An X track 54 is coupled to the pair of Y motors 48, and the X track 54 perpendicularly extends from the left Y motor 50 to the right Y motor 52.

An X-Z motor 56 is coupled to the X track 54, and the X-Z motor 56 slidably travels along the X track 54. A Z track 58 is coupled to the X-Z motor 56, and the Z track 58 lies perpendicular to the X track 54 and each of the pair of Y tracks 42. The Z track 58 slidably travels through the X-Z motor 56. A rotating tool unit 60 is coupled to the positioning unit 62. The rotating tool unit 60 comprises a rotator motor 64 coupled to the Z track 58 that has a cylindrical rotatable tool housing 66. A plurality of manicure tools 68 is coupled to the rotator motor 64. Each of the plurality of manicure tools 68 is coupled to the rotatable tool housing 66 and is in operational communication with the rotator motor 64. The plurality of manicure tools 68 comprises a shaver 70, a buffer 72, and a printer 74. The shaver 70 shapes a user's fingernails, the buffer 72 buffs the user's fingernails, and the printer 74 paints the user's fingernails.

A camera 76 is coupled to the rotator motor 64. The camera 76 is freely coupled such that it remains oriented towards the bottom side 20 of the housing 12 at all times. A brush track 78 is coupled to the housing 12. The brush track 78 extends from the left side 22 to the right side 24 within the inner cavity 26 proximal the back side 16. A brush motor 80 is coupled to the brush track 78. The brush motor 80 slidably travels along the brush track 78. The brush motor 80 has a rectangular prismatic brush extension 82 extending towards the front side 14. A waste brush 86 is coupled to the brush motor 80. The waste brush 86 has a plurality of bristles 88 coupled to the brush extension 82 and extends to the bottom side 20 of the housing 12. A tray 90 is coupled to the housing 12, and the tray 90 is slidably coupled within the tray channel 36 and has a cylindrical tray handle 94 extending through the tray aperture 34. The tray 90 receives waste from the user's hands. A plurality of heat lights 98 is coupled to the housing 12. The plurality of heat lights 98 is coupled to the top side 18 within the inner cavity 26. The pair of heat lights 98 may be two heat lights 98 coupled between the pair of window apertures 30 and one heat light 98 coupled between the pair of window apertures 30 and each of the left side 22 and the right side 24. A control panel 100 is coupled to the housing 12. The control panel 12 is coupled to the front side 14 between the pair of hand apertures 28. The control panel 100 has a plurality of control buttons 102 that comprise a start button 104, a stop button 106, and a self-clean button 108. The start button 104 and the stop button 106 control the positioning unit 62 and the rotating tool unit 60. The self-clean button 108 controls the brush motor 80. A logic module 84 is coupled to the control panel 100, and the logic module 84 is in operational communication with the pair of Y motors 48, the X-Z motor 56, the rotator motor 64, the camera 76, the brush motor 80, the plurality of heat lights 98, and the plurality of control buttons 102. A power source 110 is coupled to the logic module 84, and the power source 110 is in operational communication with the logic module 84.

In use, the user places his hands into window apertures 30, presses the start button 104 and the shaver 70 shapes a user's fingernails, the buffer 72 buffs the user's fingernails, and the printer 74 paints the user's fingernails.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An automatic manicure apparatus comprising:
a housing, the housing having a front side separated from a back side, a top side separated from a bottom side, and a left side separated from a right side defining an inner cavity, the front side having a pair of hand apertures extending through to the inner cavity, the top side having a pair of window apertures extending through to the inner cavity and aligning with the pair of hand apertures, each of the pair of window apertures having a transparent window coupled therein;
a positioning unit coupled to the housing, the positioning unit comprising:
a pair of Y tracks coupled to the housing, the pair of Y tracks comprising a left Y track and a right Y track coupled to the back side adjacent the left side and the right side, respectively, and extending perpendicularly towards the front side;
a pair of Y motors coupled to the pair of Y tracks, the pair of Y motors comprising a left Y motor and a right Y motor coupled to the left Y track and the right Y track, respectively, the Y motors slidably traveling along the Y tracks;
an X track coupled to the pair of Y motors, the X track perpendicularly extending from the left Y motor to the right Y motor;
an X-Z motor coupled to the X track, the X-Z motor slidably traveling along the X track; and a Z track coupled to the X-Z motor, the Z track lying perpendicular to the X track and each of the pair of Y tracks, the Z track slidably traveling through the X-Z motor;

a rotating tool unit coupled to the positioning unit, the rotating tool unit comprising:
  a rotator motor coupled to the Z track, the rotator motor having a rotatable tool housing;
  a plurality of manicure tools coupled to the rotator motor, each of the plurality of manicure tools being coupled to the rotatable tool housing and in operational communication with the rotator motor; and
  a camera coupled to the rotator motor, the camera being freely coupled such that it remains oriented towards the bottom side of the housing at all times;

a control panel coupled to the housing, the control panel being coupled to the front side between the pair of hand apertures, the control panel having a plurality of control buttons;

a logic module coupled to the control panel, the logic module being in operational communication with the pair of Y motors, the X-Z motor, the rotator motor, the camera, and the plurality of control buttons; and a power source coupled to the logic module, the power source being in operational communication with the logic module.

2. The automatic manicure apparatus of claim 1 further comprising the plurality of manicure tools comprising a shaver, a buffer, and a printer, the shaver shaping a user's fingernails, the buffer buffing the user's fingernails, and the printer painting the user's fingernails.

3. The automatic manicure apparatus of claim 1 further comprising a plurality of heat lights coupled to the housing, the plurality of heat lights being coupled to the top side within the inner cavity and in operational communication with the logic module.

4. The automatic manicure apparatus of claim 3 further comprising the plurality of heat lights being two heat lights coupled between the pair of window apertures and one heat light coupled between the pair of window apertures and each of the left side and the right side.

5. The automatic manicure apparatus of claim 1 further comprising:
  a brush track coupled to the housing, the brush track extending from the left side to the right side within the inner cavity proximal the back side;
  a brush motor coupled to the brush track, the brush motor slidably traveling along the brush track, the brush motor having a brush extension extending towards the front side, the brush motor being in operational communication with the logic module;
  a waste brush coupled to the brush motor, the waste brush having a plurality of bristles coupled to the brush extension and extending to the bottom side of the housing; and
  the right side of the housing having a tray aperture extending through to the inner cavity and the bottom side having a tray channel adjacent the tray aperture, a tray being slidably coupled within the tray channel and having a tray handle extending through the tray aperture.

6. The automatic manicure apparatus of claim 5 further comprising the tray handle being cylindrical and the brush extension being rectangular prismatic.

7. The automatic manicure apparatus of claim 5 further comprising the plurality of control buttons comprising a start button, a stop button, and a self-clean button, the start button and the stop button controlling the positioning unit and the rotating tool unit, the self-clean button controlling the brush motor.

8. The automatic manicure apparatus of claim 1 further comprising each of the pair of Y motors and the X-Z motor being rectangular prismatic.

9. The automatic manicure apparatus of claim 1 further comprising the rotatable tool housing being cylindrical.

10. The automatic manicure apparatus of claim 1 further comprising a plurality of feet coupled to the housing, the plurality of feet being coupled to the bottom side of the housing.

11. An automatic manicure apparatus comprising:
  a housing, the housing having a front side separated from a back side, a top side separated from a bottom side, and a left side separated from a right side defining an inner cavity, the front side having a pair of hand apertures extending through to the inner cavity, the top side having a pair of window apertures extending through to the inner cavity and aligning with the pair of hand apertures, each of the pair of window apertures having a transparent window coupled therein, the right side having a tray aperture extending through to the inner cavity and the bottom side having a tray channel adjacent the tray aperture;
  a plurality of feet coupled to the housing, the plurality of feet being coupled to the bottom side of the housing;
  a positioning unit coupled to the housing, the positioning unit comprising:
    a pair of Y tracks coupled to the housing, the pair of Y tracks comprising a left Y track and a right Y track coupled to the back side adjacent the left side and the right side, respectively, and extending perpendicularly towards the front side;
    a pair of Y motors coupled to the pair of Y tracks, the pair of Y motors comprising a left Y motor and a right Y motor coupled to the left Y track and the right Y track, respectively, the Y motors slidably traveling along the Y tracks;
    an X track coupled to the pair of Y motors, the X track perpendicularly extending from the left Y motor to the right Y motor;
    an X-Z motor coupled to the X track, the X-Z motor slidably traveling along the X track; and
    a Z track coupled to the X-Z motor, the Z track lying perpendicular to the X track and each of the pair of Y tracks, the Z track slidably traveling through the X-Z motor;
  a rotating tool unit coupled to the positioning unit, the rotating tool unit comprising:
    a rotator motor coupled to the Z track, the rotator motor having a cylindrical rotatable tool housing;
    a plurality of manicure tools coupled to the rotator motor, each of the plurality of manicure tools being coupled to the rotatable tool housing and in operational communication with the rotator motor, the plurality of manicure tools comprising a shaver, a buffer, and a printer, the shaver shaping a user's fingernails, the buffer buffing the user's fingernails, and the printer painting the user's fingernails; and
    a camera coupled to the rotator motor, the camera being freely coupled such that it remains oriented towards the bottom side of the housing at all times;
  a brush track coupled to the housing, the brush track extending from the left side to the right side within the inner cavity proximal the back side;

a brush motor coupled to the brush track, the brush motor slidably traveling along the brush track, the brush motor having a rectangular prismatic brush extension extending towards the front side;

a waste brush coupled to the brush motor, the waste brush having a plurality of bristles coupled to the brush extension and extending to the bottom side of the housing;

a tray coupled to the housing, the tray being slidably coupled within the tray channel and having a cylindrical tray handle extending through the tray aperture;

a plurality of heat lights coupled to the housing, the plurality of heat lights being coupled to the top side within the inner cavity, the plurality of heat lights being two heat lights coupled between the pair of window apertures and one heat light coupled between the pair of window apertures and each of the left side and the right side;

a control panel coupled to the housing, the control panel being coupled to the front side between the pair of hand apertures, the control panel having a plurality of control buttons, the plurality of control buttons comprising a start button, a stop button, and a self-clean button, the start button and the stop button controlling the positioning unit and the rotating tool unit, the self-clean button controlling the brush motor;

a logic module coupled to the control panel, the logic module being in operational communication with the pair of Y motors, the X-Z motor, the rotator motor, the camera, the brush motor, the plurality of heat lights, and the plurality of control buttons; and a power source coupled to the logic module, the power source being in operational communication with the logic module.

\* \* \* \* \*